Patented June 15, 1943

2,321,604

UNITED STATES PATENT OFFICE 2,321,604

METHOD OF HYDROCARBON CONVERSION

Vladimir A. Kalichevsky and George F. Hornaday, Woodbury, N. J., assignors to Socony-Vacuum Oil Company, Incorporated, New York, N. Y., a corporation of New York No Drawing. Application December 22, 1939, Serial No. 310,568

2 Claims. (Cl. 196—52)

This invention is directed to improvements in vapor phase catalytic cracking resulting in significant and marked changes in the properties of the products arising therefrom.

This invention is particularly directed to those processes of vapor phase catalytic cracking wherein the material to be cracked is passed over a catalytic mass of a clay-like nature, such as, for example, a mixture of alumina and silica. Such processes are fully explained in the various United States patents of Eugene Houdry and associates.

In short the method of cracking is one in which a petroleum oil, heated to about 850° F. in the vapor form, is passed at that temperature through a space containing a contact mass composed of particles, pellets, or granules consisting of alumina and silica, having the nature of a hydrated aluminum silicate. The vapors, in passage through said mass are converted to a large extent to material of gasoline boiling range, of desirable high octane value, a portion of the material remaining unchanged and of properties essentially the same as the charge. The remainder of the charge is converted into gaseous hydrocarbons and into a small amount of cokey material which remains upon the contact mass and is periodically burned off by a regeneration which may be in situ.

The material which is used as a catalyst appears to be possessed of a physical capability of promoting reaction instead of a chemical capability and this ability is distributed in vary degrees through wide variety of materials, natural, partially processed, and synthetic, which in general are of the clay type, comprising in their composition alumina, silica, or both, such as fuller's earth, "Filtrol" clays, bauxite, silica gel, naturally occurring adsorbent clays generally related to fuller's earth, acid washed adsorbent clays and other partially processed clays, and many synthetic aluminates, silicates, and mixtures thereof.

The material which passes through the reaction zone apparently without substantial change is known as "recycle' stock. This invention has specifically to do with a modification of the operation which produces unexpected and marked changes in this recycle stock.

As pointed out previously, the normal recycle stock is a gas oil, not unlike the original charge in physical properties. For example in an operation conducted at 875° F. and 30# per square inch gauge pressure, to produce about 32% of gasoline of 400° F. end point and about 58% of recycle stock from a charging stock which in turn was a recycle stock derived from one similar treatment of gas oil from Oklahoma City crude, the properties of the charge and of the recycle stock produced therefrom were as follows:

Table I

|  | Charge | Recycle stock |
|---|---|---|
| Gravity_____° A. P. I._ | 33.4 | 30.8 |
| Pour_____° F._ | 15 | 10 |
| Aniline No._____° F._ | 162 | 137 |
| Sulphur_____per cent wt._ | 0.16 | 0.18 |
| Flash (P. M.)_____° F._ | 224 | 214 |
| Carbon residue_____per cent wt._ | 0.03 | 0.09 |
| B. S. & W._____per cent vol._ | 0.02 | Trace |
| S. U. vis. m 100° F.___sec._ | 41.3 | Less than 39 |
| Cetane number_____ | 55 | 46 |
| Distillation—A. S. T. M., ° F.: |  |  |
| I. B. P._____ | 433 | 438 |
| 5_____per cent._ | 495 | 470 |
| 10_____do____ | 511 | 480 |
| 20_____do____ | 532 | 497 |
| 30_____do____ | 547 | 512 |
| 40_____do____ | 562 | 524 |
| 50_____do____ | 578 | 542 |
| 60_____do____ | 592 | 558 |
| 70_____do____ | 608 | 578 |
| 80_____do____ | 626 | 596 |
| 90_____do____ | 650 | 627 |
| EP_____ | 707 | 676 |
| Rec._____per cent._ | 99.0 | 98.0 |
| Res._____do____ | 1.0 | 2.0 |

This invention is based upon the discovery that unexpected and useful results flow from the introduction of small amounts of ammonia into the stream of vapors entering the catalyst mass. Without substantial change in the yields of either gasoline or cycle stock, and without substantial change in the character of the gasoline produced, useful changes in the character of the cycle stock are observed. The physical characteristics of the normally produced cycle stock fit it quite well for use as a fuel in compression ignition engines, but, probably due to its having been passed through a cracking process, its chemical nature is so altered as to give it a lower cetane numbed, that is, to make it a less desirable fuel for compression ignition engines than was the gas oil from which it has been derived. Upon the introduction of ammonia into the cracking step it has been observed that the cycle stock produced has an unexpected improvement in cetane number, in amounts of commercial significance, sufficient to considerably enhance the usefulness of the product as a fuel for compression ignition engines, and that without material change in the other properties of the product.

To show the effect of this change, which is of obvious value, Table II contrasts the newly produced recycle stock with the previously mentioned normally produced recycle stock.

Table II

| Properties | Catalytically cracked in absence of ammonia | Catalytically cracked in presence of ammonia |
|---|---|---|
| Gravity ............................ ° A. P. I.. | 30.8 | 30.5 |
| Pour .................................... ° F.. | 10 | 10 |
| Flash, P. M ........................ ° F.. | 214 | 186 |
| Sulfur ........................ per cent wt.. | 0.18 | 0.24 |
| Aniline No ........................ ° F.. | 137 | 141 |
| Carbon res .................. per cent wt.. | 0.09 | 0.07 |
| B. S. & W .................. per cent vol.. | Trace | 0.03 |
| S. U. V. @ 100° F ................ sec.. | <39 | <39 |
| Cetane No .......................... | 46 | 52 |
| Distillation—A. S. T. M., ° F.: | | |
| I. B. P .......................... | 438 | 432 |
| 5 .......................... per cent.. | 470 | 486 |
| 10 .......................... do.... | 480 | 496 |
| 20 .......................... do.... | 497 | 512 |
| 30 .......................... do.... | 512 | 523 |
| 40 .......................... do.... | 524 | 536 |
| 50 .......................... do.... | 542 | 550 |
| 60 .......................... do.... | 558 | 565 |
| 70 .......................... do.... | 578 | 582 |
| 80 .......................... do.... | 598 | 603 |
| 90 .......................... do.... | 627 | 632 |
| E. P .......................... | 676 | 700 |
| Rec .......................... per cent.. | 98.0 | 98.5 |
| Res .......................... do.... | 2.0 | 1.5 |

The above results were experienced when introducing to the vapors undergoing cracking from 0.2–0.7 percent by weight of anhydrous ammonia. Usually not more than one percent by weight of charge is sufficient to accomplish the desired results. It will be observed that the physical properties of the product have not been changed, but that there has been an increase of 6 points in cetane number.

We claim:

1. That method for the conversion of petroleum hydrocarbons comprising vaporizing hydrocarbons of high boiling point without substantial cracking during vaporization, superheating said vapors to a temperature appropriate for catalytic cracking to gasoline without substantial cracking of said vapors during said heating, adding a small amount of ammonia to said vapors, then passing said vapors into contact with a clay-like catalytic contact mass to accomplish a substantial cracking of the high boiling hydrocarbons to gasoline, and fractionating the products of cracking to separate therefrom the gasoline and a heavier oil of light gas oil nature, whereby, without substantial change in the physical properties or yields of gasoline and gas oil produced, an increase in cetane number of the gas oil over that produced in the absence of said ammonia is brought about.

2. That method for the conversion of petroleum hydrocarbons comprising vaporizing hydrocarbons of high boiling point without substantial cracking during vaporization, superheating said vapors to a temperature appropriate for catalytic cracking to gasoline without substantial cracking of said vapors during said heating, adding a small amount of ammonia, not more than about one percent by weight, to said vapors, then passing said vapors into contact with a clay-like catalytic contact mass to accomplish a substantial cracking of the high boiling hydrocarbons to gasoline, and fractionating the products of cracking to separate therefrom the gasoline and a heavier oil of light gas oil nature, whereby, without substantial change in the physical properties or yields of gasoline and gas oil produced, an increase in cetane number of the gas oil over that produced in the absence of said ammonia is brought about.

VLADIMIR A. KALICHEVSKY.
GEORGE F. HORNADAY.

CERTIFICATE OF CORRECTION.

Patent No. 2,321,604. June 15, 1943.

VLADIMIR A. KALICHEVSKY, ET AL.

It is hereby certified that error appears in the printed specification of the above numbered patent requiring correction as follows: Page 1, first column, line 33, for "vary" read --varying--; and second column, line 16, for "S. U. vis. m 100° F." read --S. U. visc. @ 100° F.--; line 42, for "numbed" read --number--; and that the said Letters Patent should be read with this correction therein that the same may conform to the record of the case in the Patent Office.

Signed and sealed this 10th day of August, A. D. 1943.

(Seal)

Henry Van Arsdale,
Acting Commissioner of Patents.